United States Patent [19]

Doherty

[11] 4,084,490
[45] Apr. 18, 1978

[54] CONTAINER BOTTOM CUTTING APPARATUS AND METHOD

[75] Inventor: Thomas E. Doherty, Setauket, N.Y.

[73] Assignee: Owens-Illinois, Inc., Toledo, Ohio

[21] Appl. No.: 768,245

[22] Filed: Feb. 14, 1977

[51] Int. Cl.² .................... B65H 17/42; B26D 5/20
[52] U.S. Cl. ............................... 93/55.1 R; 83/23; 83/152; 83/336; 93/1.3
[58] Field of Search ............... 93/1.3, 36 B, 39.1 R, 93/55.1 R, 44; 83/23, 35, 36, 55, 112, 113, 116, 152, 233, 235, 236, 250, 251, 336, 323, 322; 113/121 R, 121 A, 121 C

[56] References Cited

U.S. PATENT DOCUMENTS

| | | | |
|---|---|---|---|
| 972,767 | 10/1910 | Jenkins | 93/55.1 R |
| 1,161,544 | 11/1915 | Starr | 93/55.1 R |
| 2,218,541 | 10/1940 | Kronquest | 83/336 X |
| 2,593,439 | 4/1952 | Gora | 113/121 R |
| 3,248,978 | 5/1966 | Muller | 83/36 |

Primary Examiner—James F. Coan
Attorney, Agent, or Firm—David R. Birchall; Myron E. Click; David H. Wilson

[57] ABSTRACT

An apparatus for cutting the bottom disc used in the manufacture of disposable drinking containers. A web of foam plastic container bottom material is fed through a rotary cutting die. Discs of foam plastic material are then sequentially positioned so that they can be affixed to container sidewalls which are moving in seriatim fashion past the cutting apparatus. The direction of movement of the web of foam plastic material through the cutting apparatus is periodically reversed so that the maximum number bottom discs can be cut from the web of material. The method of moving the web of material in an intermittent flow plus the movement of the severed discs is also set forth in detail.

17 Claims, 8 Drawing Figures

CONTAINER BOTTOM CUTTING APPARATUS AND METHOD

BACKGROUND OF THE INVENTION

It has been well known for quite some time to manufacture disposable drinking containers from paper products. The sidewall of the paper container is cut in an arcuate pattern, then is formed into a frusto-conical shell. A paper bottom is then bonded or mechanically attached to the sidewall shell to form a cup that will handle hot or cold beverages. In recent years paper containers such as for example cups have been supplemented by containers manufactured of plastic material. The well known steam-chested plastic container made of expanded plastic beads represents a one piece container that has been manufactured in great numbers.

To overcome certain inherent disadvantages of paper containers and one piece steam-chested plastic containers, the container industry has found it advantageous to form various sizes of containers of plastic foam sheet material. The switch to containers made of plastic sheet foam permitted exterior decorations to be printed on the foam sheet stock by means of high speed printing techniques. It is of course recognized that the older steam-chested containers had to be decorated after the containers had been formed to their final configuration.

A further advance in the art of container manufacture occurred when it was discovered that oriented foam plastic material could be used in the manufacture of containers such as cups. When an oriented foam sheet material is utilized it is no longer necessary to cut the container sidewall as an arcuate blank. The blank can be cut in rectangular form, then formed into a cylinder by affixing opposite ends of the rectangular blank one to the other. The cylinder thus formed is subjected to heat, thus causing it to shrink in controlled fashion around a properly contoured container mandrel.

The bottom of the plastic foam container is cut in the form of a disc. The material for the container bottom disc can be of foam plastic material similar to the sidewall. The bottom discs are attached to the container sidewall by bonding with an adhesive or are heat sealed to form an integral part of the container. The container bottom disc can also be positioned within the lower edge of a cylindrical cup shell, thus permitting the shell to shrink around the bottom disc. Final sealing and contouring can be attained by pressing or ironing the container bottom subsequent to attaching the sidewall thereto.

Heretofore it has been common to form container bottoms by punching them out of sheet material, then moving them from the position where severing occurred to a position where the container bottom is combined with the sidewall of the container.

The just described procedure involved several different movements generally in a horizontal plane. The translation of the container bottom to a position where it could be combined with a container sidewall became the limiting factor in increasing the speed of the overall container fabricating machinery. Several approaches such as stacking the previously severed container bottoms, then feeding them one by one to the assembly line did not provide an adequate solution to the problem.

GENERAL DESCRIPTION OF THE INVENTION

The present invention relates to the manufacture and method of fabricating portions of a container. More particularly, this invention relates to an apparatus for cutting the bottom discs for containers such as for example disposable cups. The invention also is directed to a method of feeding a web of material to and through a disc cutting apparatus.

As commented upon before, the prior art container bottom cutting devices cut the individual discs from a web of material then by means of a starwheel like arrangement translated the container bottoms from the direction of motion of the web to the line that contained the container shells. The translation of the container bottoms required very accurate alignment and delivery to the container shells.

In the present invention the line of action involving the cutting of the container discs has been made to coincide with the line that contains the container shells, therefore, there is no lateral translation required. Consequently, the apparatus can attain higher production speeds and maintain tolerance accuracies more easily than heretofore was possible. It will become apparent in the ensuing description of the invention that once the container bottom has been severed from the web of material, it does not move relative to its resting place until it is delivered to the container mandrel. This method of severing container bottoms and translating them to their final designation without actually moving them from the surface where cutting occurred permits a more economical fabrication of the finished article and at greater line speeds than in the past.

A web of container bottom material such as foam sheet stock is fed to the apparatus of the present invention. The container bottoms are blanked out by a rotary die driven in synchronization with a delivery wheel. The container bottoms are delivered to their proper position within the lower portion of the container sidewall shell whereupon the shell is caused to shrink around the container bottom.

The container bottoms are cut by individual dies located circumferentially around a cutting die wheel at spaces equal to the spacing of the container shells on their individual carrier line. Since the cutting dies are located at a distance one from another to properly match the container shell line, the container blanks are positioned also along the web of material at the same distance as the container shell line. This spacing is considerably greater than the diameter of the container bottom, consequently, less than the optimum number of container blanks can be cut from the web. In other words if the web moves at the same speed as the container shell line, there is too much space between container bottoms, thus leading to a greater consumption of web material.

The present invention permits the container bottoms to be cut from a web of material with very little waste regardless of the spacing of the individual cutters on the cutting die. The web of material advances with the arcuate surface of the cutting die while actual cutting is being accomplished. The direction of movement of the web is then reversed to position the web so that the next die cut will be closely adjacent to the previously cut out container bottom. The web reversing and positioning is adjustable and can be adapted readily to containers of different sizes and spacing on the assembly line.

Accordingly, it is an object of the present invention to provide an improved delivery system for container bottoms.

More particularly, it is an object of this invention to sever container bottoms from a web of material where the web is aligned in a vertical plane containing the container sidewall shells to which the container bottoms are affixed.

Another object of the invention is to deliver a container bottom to an assembly without moving it from the surface area where it was severed.

A further object of this invention is to conserve the blanking space between individual container bottoms, thus permitting a maximum number of container bottoms to be extracted from a given web of material.

An additional object of the present invention is to increase the speed at which a container manufacturing machine can operate.

It is also an object of this invention to provide a method of feeding a web of material to a disc cutting apparatus whereby a maximum number of blanks can be cut from the web.

Still another object of the present invention is to set forth a method of first advancing a web of material so that a disc can be cut therefrom then reversing the direction of the web so that the next consecutive disc is blanked from an area closely adjacent to the area where the previously severed disc was blanked.

Another object of this invention is to extract the cut bottom discs from a web of material to reduce the waste to a minimum.

For a further understanding of the present invention and the objects thereof, attention is directed to the drawings, the following description thereof, the detailed description of the invention and the appended claims.

DETAILED DESCRIPTION OF THE INVENTION

Figure 1:
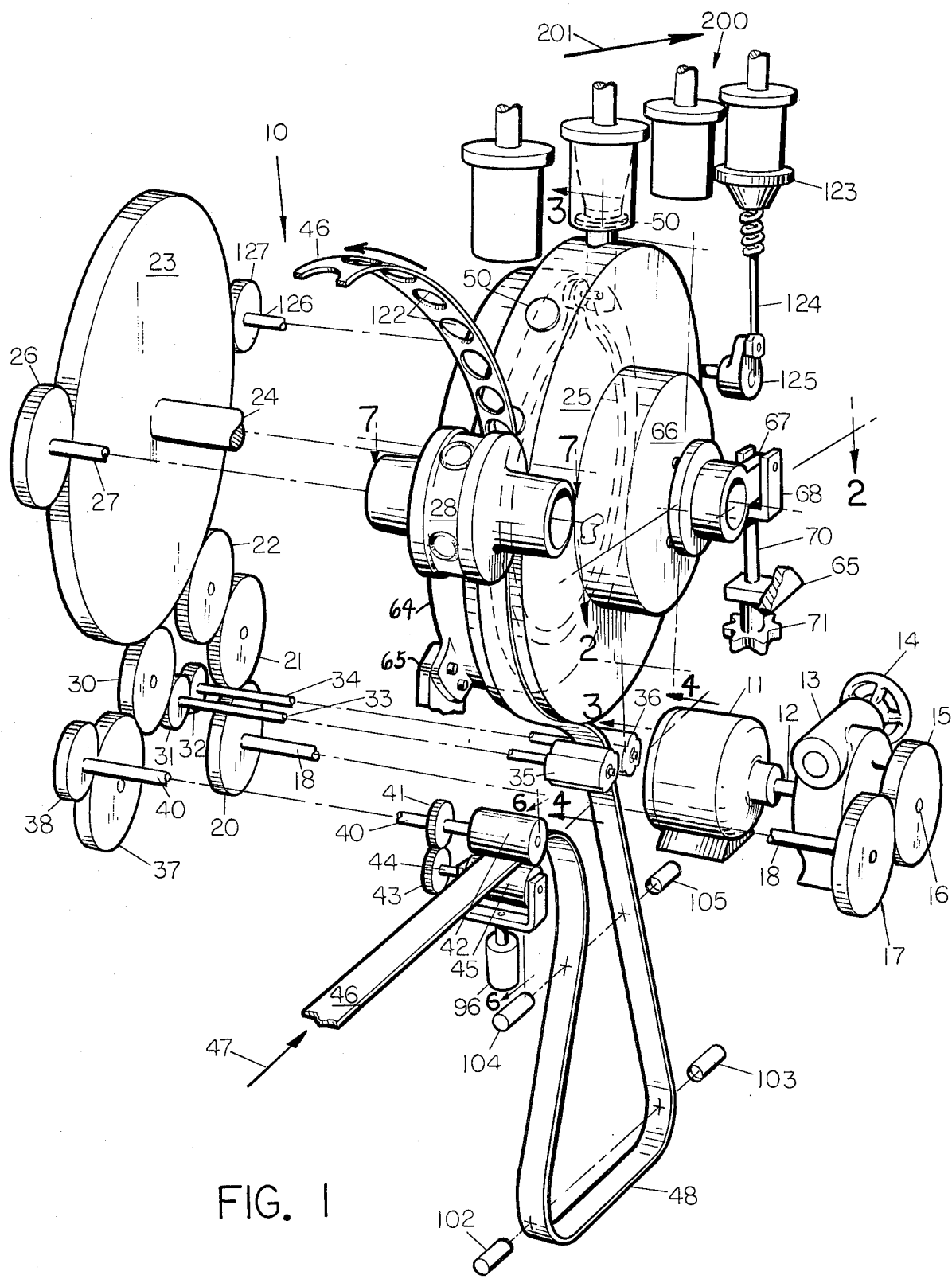
FIG. 1 is a perspective view showing the interrelationship between the various gears associated with the apparatus.

In FIG. 1 the base and support sidewalls have been dispensed with in order to provide a clearer view of the various components and their interaction with one another. FIG. 1 is comprised of two parts. The general cutting apparatus identified broadly by numeral 10 occupies most of the FIG. 1. At the very top of FIG. 1 the conveyor line carrying container sidewall shells is depicted at 200. The container conveyor 200 is a complex apparatus in its own right, however, only a small portion is shown to illustrate the coaction between conveyor 200 and cutting apparatus 10. The conveyor 200 moves in the direction of arrow 201.

Cutting apparatus 10 is powered with, for example, a high torque motor 11. A connecting shaft 12 connects motor 11 with an adjustable right angle gearbox 13. Gearbox 13 can be adjusted by means of handwheel 14 to either advance or retard the speed of cutting apparatus 10 with respect to the speed of container conveyor 200. This adjustment is particularly important when starting up or when different types of containers are being manufactured. The rotational torque generated by gearbox 13 is delivered through gear 15 which is attached to shaft 16. Gear 15 meshes with gear 17, it being understood that the reaction forces of the gears are taken out by the frame which is not shown for the most part. Gear 17 is the beginning of the gear train that delivers power to the various components of cutting apparatus 10. Gear 17 is positioned on the right-hand end of shaft 18. The left-hand end of shaft 18 contains gear 20 which in turn meshes with first idler gear 21. It is understood that gears such as gear 21 does have a shaft centrally located and properly journaled, however, it is purposely not shown in the drawings for the sake of clarity. A second idler gear 22 contacts the first idler gear 21 and delivers its rotational torque to main drive gear 23. The main drive gear 23 is affixed to the left-hand end of main shaft 24. A transfer wheel 25 is attached near the right-hand end of main shaft 24. The transfer wheel is an important feature of the present invention and will be discussed and described more fully later.

The main drive gear 23 meshes with gear 26 which in turn is immobilized on the left-hand end of cutter drive shaft 27. The rotary die 28 is attached to the right-hand end of cutter drive shaft 27. Thus, rotary die 28 is driven in synchronism with transfer wheel 25.

Returning once again to main drive gear 23 it can be observed that gear 30 is positioned toward the lower peripheral extent of gear 23. Gear 30 can be considered as a secondary drive gear since it has a multipurpose function. Gear 30 first meshes with gear 31 which in turn is coupled to gear 32. Gears 31 and 32 are respectively attached to the ends of drive shafts 33 and 34. A segmented roller 35 is fixed to the right-hand end of drive shaft 33. A coacting segmented roller 36 is placed in juxtaposed relationship to segmented roller 35. Segmented roller 36 derives its rotational power by means of drive shaft 34 to which it is firmly attached. The pair of segmented rollers 35 and 36 perform an important function which will be discussed more fully infra.

Main drive gear 23, through secondary drive gear 30, supplies power to gear 37. Gear 37 interacts with gear 38 which is fixed to the left-hand end of drive shaft 40. A small gear 41 is attached toward the right-hand end of drive shaft 40. Drive shaft 40 extends through small gear 41 and terminates with feed roller 42 which is affixed to the right-hand terminal of drive shaft 40. Small gear 41 meshes with a similar sized gear 43 which is positioned beneath small gear 41. Gear 43 is coupled to shaft 44 and shaft 44 has feed roller 45 fixed to the right-hand end thereof. Feed rollers 42 and 45 work together in a manner to be described later.

A web of material 46 such as by way of example foam plastic is shown as it enters the cutting apparatus 10. The direction of movement of web 46 is shown by arrow 47. Web 46 passes between feed rollers 42 and 45 whereupon it comes under the influence of gravity and drops into a festoon. Since the resiliency of web 46 is quite high and its mass is minimal, the festoon is not inclined to have a very sharp curvature at its lowermost extent 48. From the lower extent 48 of the festoon, the web 46 passes through segmented rollers 35 and 36. Web 46 then encounters the periphery of transfer wheel 25. The web 46 then proceeds arcuately upward and through the bight formed between transfer wheel 25 and rotary die 28. The circular container bottoms 50 are severed from web 46 and the scrap portion of web 46 exits from cutting apparatus 10.

Figure 2:
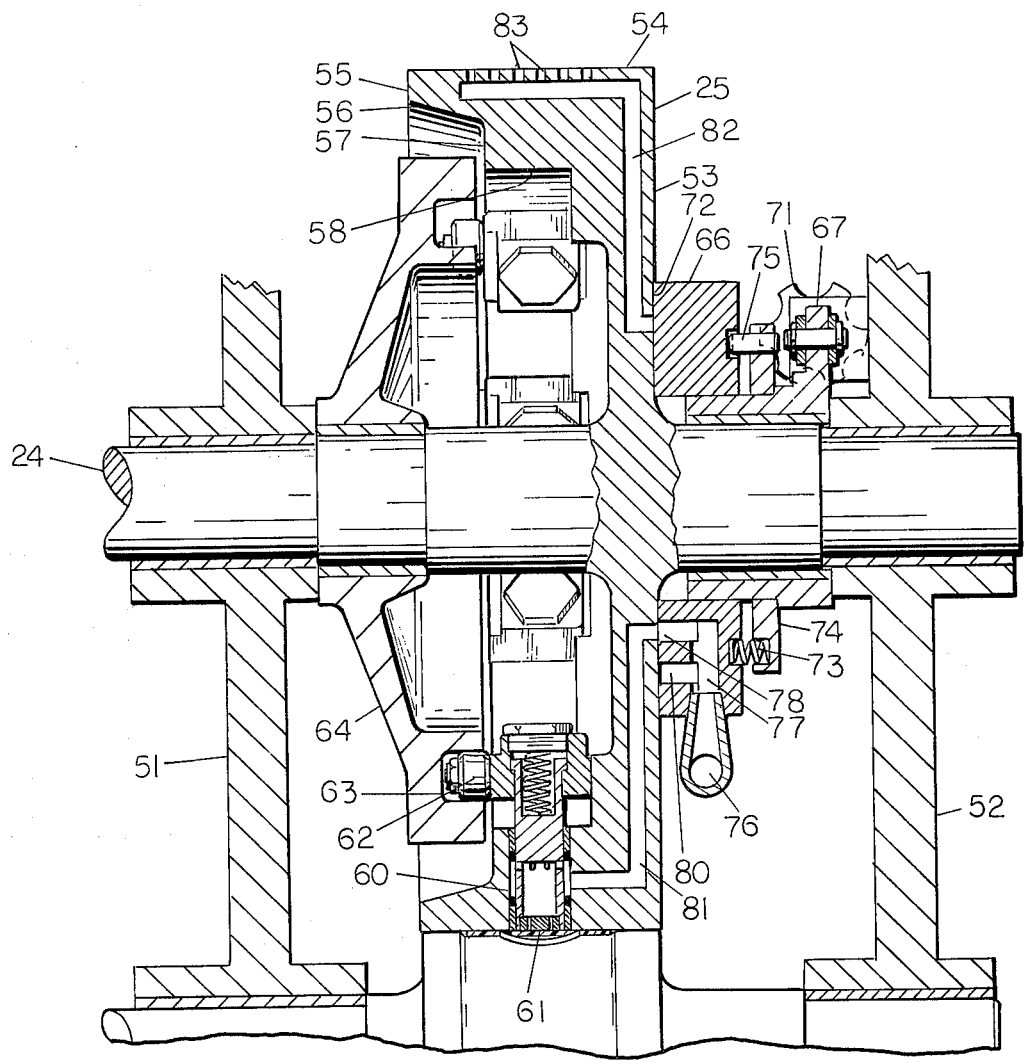
FIG. 2 is a top view of the delivery wheel shown part in section taken generally along lines 2—2 of FIG. 1.

Attention is now directed to FIG. 2 which shows more detail associated with the overall view of the transfer wheel 25 shown in FIG. 1. Transfer wheel 25 is attached to main drive shaft 24 which is journaled in side support frames 51 and 52. Transfer wheel 25 has a hollow interior and the view shown in FIG. 2 shows that interior from just above the major diameter downward. The transfer wheel 25 has a planar surface 53 situated on the right-hand side thereof. The periphery 54 is a cylindrical surface of revolution. The left-hand side of transfer wheel 25 has a flange 55. The interior sidewall 56 of flange 55 is frusto-conical in configuration with the smallest diameter centrally located. A wall 57 meets with the small end of frusto-conical sidewall 56. Wall 57 is perpendicular to the axis of main drive shaft 24. A cylindrically shaped interior surface 58 joins with the radially inward extent of wall 57. Interior surface 58 is concentric with peripheral surface 54 and provides an inside working surface for transfer wheel 25. The interior surface 58 contains a series of radially aligned bores 60. Each one of the bores 60 contains an essentially identical mechanism and hereafter only one such bore 60 and its associated parts will be described. The bore 60 can be seen in the lower portion of FIG. 2. An ejector rod 61 is contained within bore 60. Ejector rod 61 can move in a radial direction within the confinement of bore 60. Ejector rod 61 moves under the influence of cam follower 62. Cam follower 62 fits into cam groove 63 of stationary cam support 64. Stationary cam support 64 is mounted in fixed relationship to the main frame 65 as shown in FIG. 1. The main drive shaft 24 passes through stationary cam support 64.

In the right-hand of FIGS. 1 and 2 is shown a stationary vacuum manifold 66. The vacuum manifold 66 is stabilized by main drive shaft 24 which passes therethrough. Vacuum manifold 66 is prevented from rotating by being affixed to a cantilevered arm 67. Arm 67 has attached to its extremity a bifurcated clevis 68. (See FIG. 1.) Clevis 68 terminates at its lower extent with threaded shaft 70. A handwheel 71 is fixed to frame 65. An adjustment supplied through handwheel 71 rotates stationary vacuum manifold 66 either clockwise or counterclockwise as desired. The just described connection also prevents stationary vacuum manifold 66 from rotating freely with transfer wheel 25.

The interface 72 between transfer wheel 25 and stationary vacuum manifold 66 is maintained in an airtight manner by the thrust generated through springs 73. Springs 73 are biased between vacuum manifold 66 and backup plate 74. Since the springs 73 do not provide a satisfactory method for delivering of the adjusting torque attained through handwheel 71, a pin 75 in the form of a detent fits into a recess in vacuum manifold 66. This arrangement permits an adjusting torque to be applied to vacuum manifold 66 yet does not interfer with the biasing effect gained through springs 73.

A vacuum line attachment is shown at 76 as depicted at the lower portion of FIG. 2. The vacuum line attachment 76 communicates with the hollow interior 77 of the vacuum manifold 66. The vacuum cavity within vacuum manifold 66 extends to interface 72 by arcuate grooves 78 and 80 positioned in manifold 66. The grooves 78 and 80 can be seen in section in FIG. 2. Vacuum supply groove 78 communicates with vacuum port 81 which in turn is connected with the interior of ejector rod 61. In a similar manner vacuum port 82 is in communication with a series of holes 83 in the periphery of transfer wheel 25.

Figure 3:
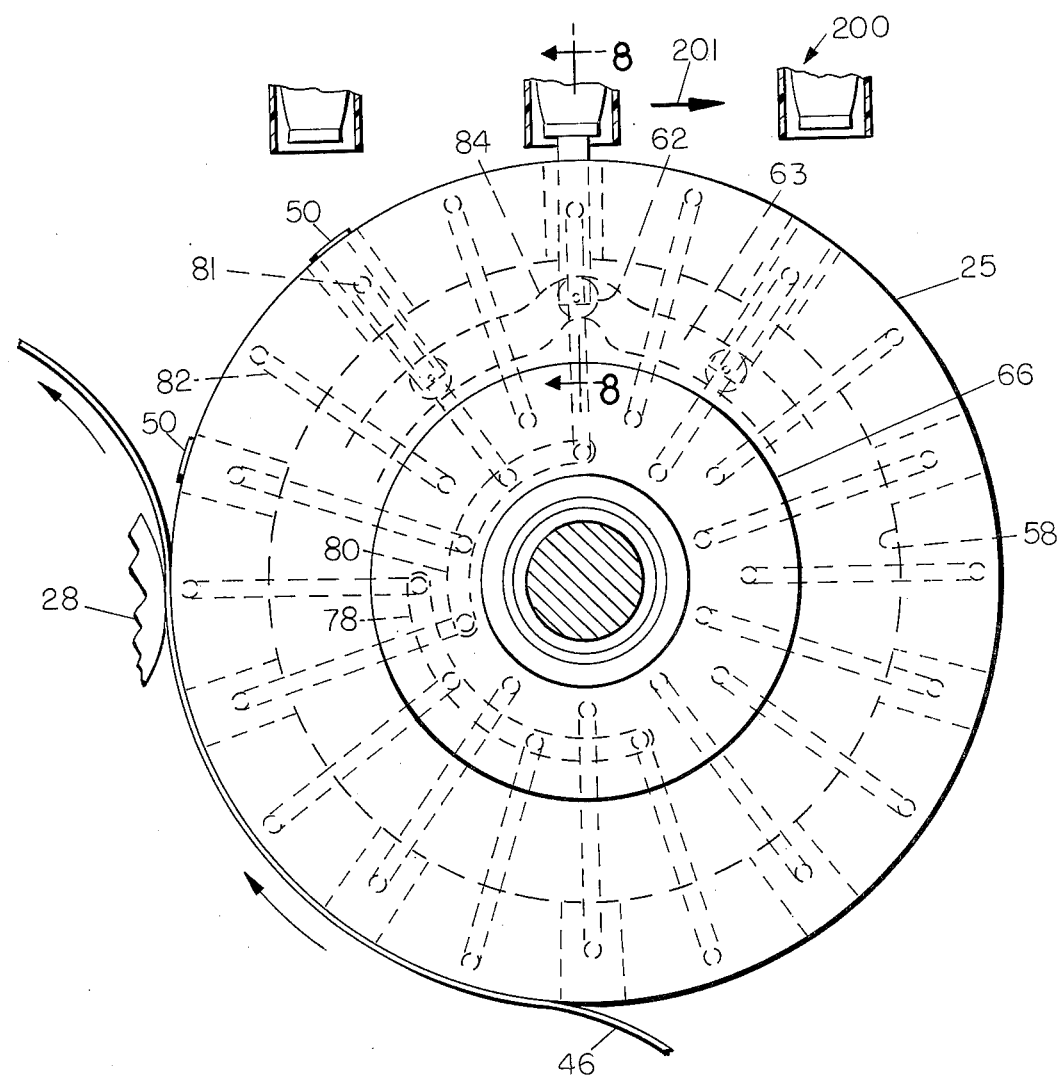
FIG. 3 is an elevational view of the delivery wheel and container shell conveyor line looking in the direction along lines 3—3 of FIG. 1.

Reference is now made to FIG. 3 which shows several features of the invention in and around the transfer wheel 25. The container conveyor 200 is shown at the uppermost area of FIG. 3. The containers move in the direction of arrow 201. The containers are positioned in spaced apart relationship by means of a conveyor (not shown). Transfer wheel 25 is shown immediately beneath conveyor 200. The stationary vacuum manifold 66 is shown in front of transfer wheel 25. The arcuate grooves 78 and 80 contained within vacuum manifold 66 are shown in dotted lines. The vacuum ports 81 and 82 contained within transfer wheel 25 are also shown in dotted radially extending lines. It can be observed that a vacuum can be applied selectively to web 46. Web 46 contacts transfer wheel 25 toward the bottom as shown in FIG. 3 and FIG. 1. Web 46 is immobilized against the peripheral surface of transfer wheel 25 as web 46 moves arcuately toward rotary die 28. The vacuum afforded through ports 82 and arcuate groove 80 is effective only so long as the ports 82 remain coupled to groove 80. As shown, the web is no longer held to the outside face of transfer wheel 25 once the container bottom 50 has been severed by rotary die 28. Note there is a circumferential overlap afforded by arcuate grooves 78 and 80. As the foam material is about to be released from the influence of vacuum supplied by vacuum ports 82, additional vacuum is centrally supplied to ejector rods 61. This vacuum force is applied directly to the newly severed container bottom 50. The container bottom 50 is thus held in position until it is finally delivered to the containers aligned along conveyor 200.

FIG. 3 also shows, in dotted lines, the interior surface 58 of transfer wheel 25. Cam groove 63 is positioned just radially inward from interior surface 58. Cam groove 63 is shown in dotted lines. At the zenith of the cam groove is shown a departure or radially protruding section 84 of cam groove 63. When the cam follower 62 meets the protruding section 84 of cam groove 63 the cam follower and the ejector rod 61, which is attached thereto, are thrust radially outward. This outward movement of ejector rod 61 lifts container bottom 50 away from the surface of transfer wheel 25 and toward the bottom of the container sidewall blank carried by conveyor 200. The container bottom is thus attached to the container and moves away from cutting apparatus 10.

While it is not considered to be a part of the present invention, it is believed necessary to describe the conditions under which container bottoms 50 are taken from apparatus 10. Conveyor 200 contains a plurality of container mandrels spaced equidistant from one another. The mandrels can be equipped with vacuum ports positioned in the bottom to facilitate the pickup of the container bottoms from the ends of ejector rods 61. The sidewall shells of te containers can be folded or attached to the container bottoms. If material such as oriented plastic foam material is utilized, heat can be applied to the container shell, thus causing it to shrink around the bottom of the mandrel and the container bottom that has been positioned against the mandrel by the apparatus of the present invention.

Figure 4:
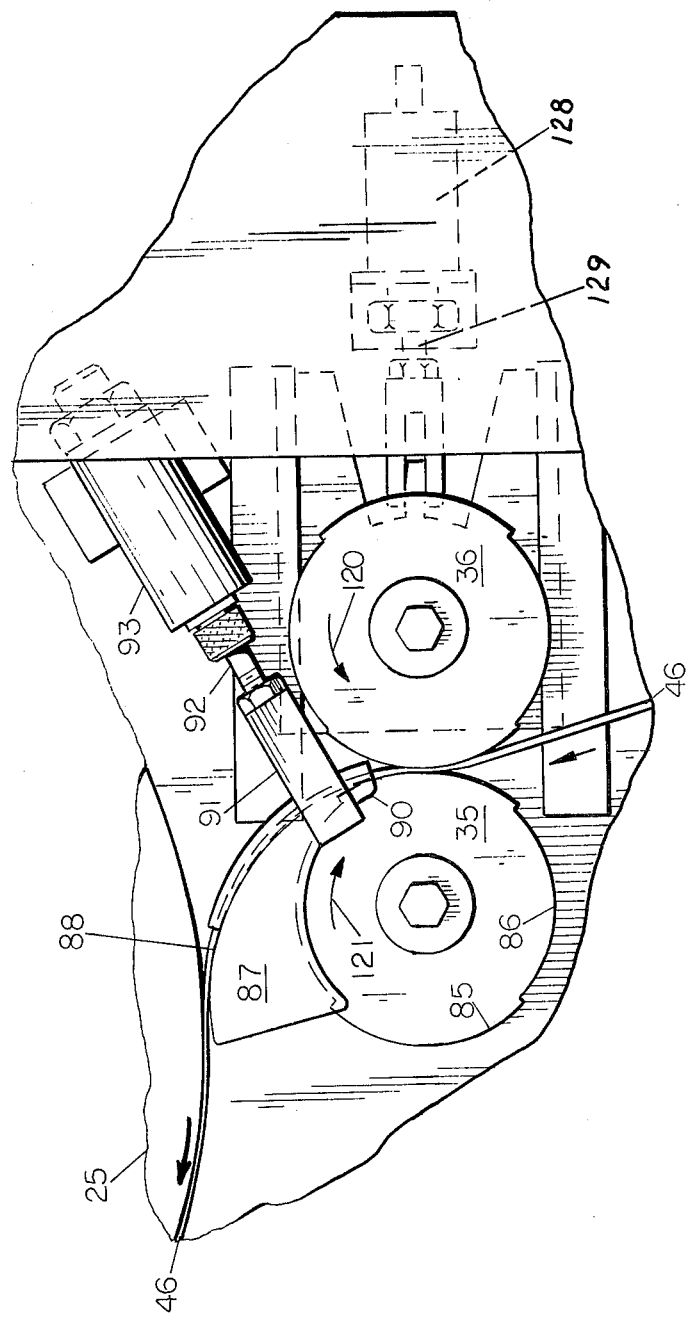
FIG. 4 is an elevational view of the web reversing rollers taken along lines 4—4 of FIG. 1.

FIG. 4 is a view taken along the lines 4—4 shown in FIG. 1. Segmented rollers 35 and 36 are shown along with the bottom of transfer wheel 25. Web 46 enters as shown at the bottom of FIG. 4 and exits at the top left side. Rollers 35 and 36 share the same peripheral configuration, therefore, the geometry associated with only one roller will be described next. As previously mentioned, segmented roller 35 receives its rotational torque from gear 31 which moves with a constant angular velocity. The external contour of roller 35 varies from a maximum radius at land 85 to a minimum radius at groove 86. There are two raised lands 85 on each roller 35 as shown in the drawing. The lands 85 are diametrically positioned and each one has a circumferential extent of approximately 90°. Thus, it can be seen roller 35 is roughly divided into quadrants with the lands 85 and grooves 86 being alternatively disposed. Segmented roller 36 shares the same geometry as roller 35; the rollers 35 and 36 are oriented such that the lands 85 of each roller meet and share a common tangent. Likewise, the grooves meet two times each revolution. It is of course understood that it is possible to use only one land 85 per roller and vary the angular velocity and the roller diameter to achieve the same result as set forth in the preferred embodiment shown in the drawings.

A stationary guide 87 is positioned adjacent to segmented roller 35. The work surface 88 of guide 87 is convoluted in the form of a spiral. The leading edge 90 of work surface 88 receives web 46 as it exits from segmented rollers 35 and 36. Web 46 is guided over work surface 88 and is deposited against the periphery of transfer wheel 25. A clamp bar 91 is positioned so that it will move against work surface 88 of stationary guide 87. Clamp bar 91 is positioned on the front end of an adjustable rod 92. The adjustable rod 92 and the movable arm of air cylinder 93 are one and the same. Air cylinder 93 is mounted to the frame 65 in a conventional manner.

Figure 5:
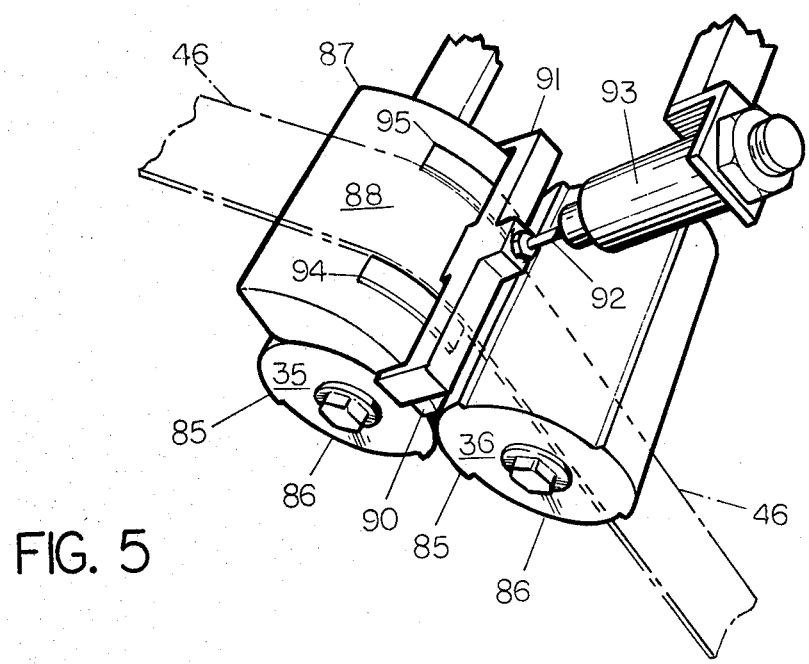
FIG. 5 is a perspective view of the feed rollers shown in FIGS. 1 and 4.

FIG. 5 shows a perspective view of the segmented rollers 35 and 36. Web 46 can be seen as it traverses rollers 35 and 36 and as it passes over stationary guide 87 and beneath clamp bar 91. A pair of guide bars 94 and 95 are fixed to the surface of stationary guide 87. The guide bars 94 and 95 prevent web 46 from moving in a lateral direction just prior to its pickup by transfer wheel 25. The guide bars 94 and 95 guarantee a symmetrical delivery of the web 46 to transfer wheel 25. The coaction of the clamp bar 91 and the segmented rollers 35 and 36 will be discussed in greater detail later.

Figure 6:
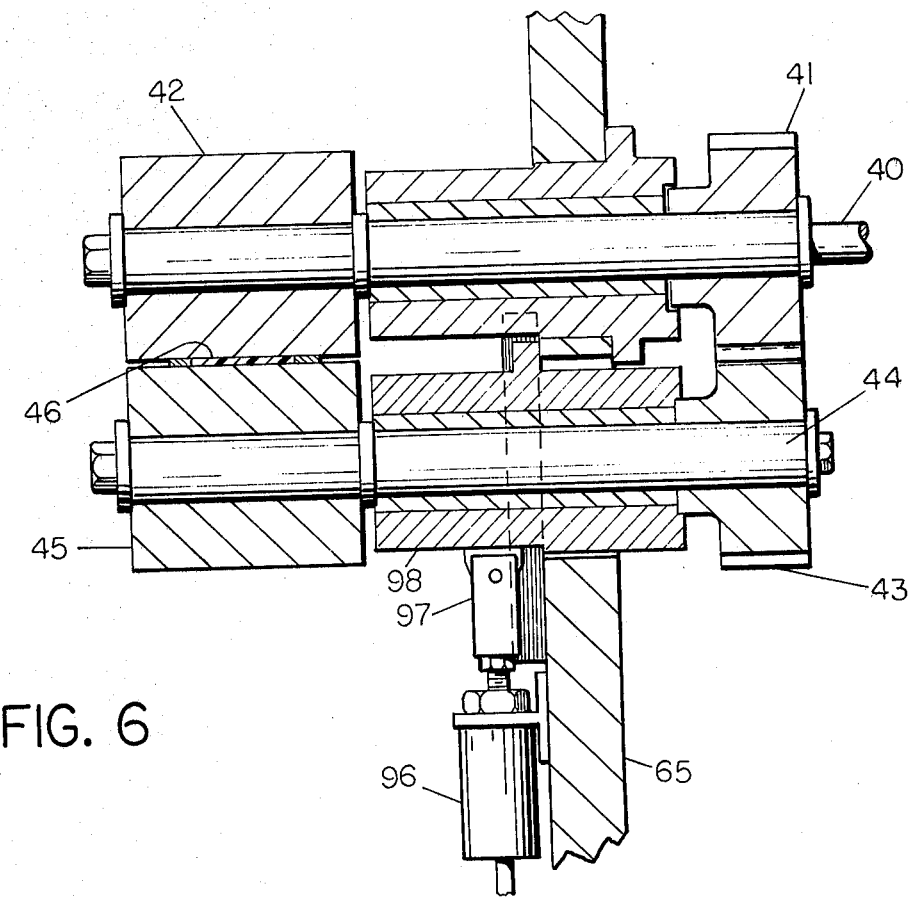
FIG. 6 is an elevational view part in section of the web feed rollers along lines 6—6 of FIG. 1.

FIG. 6 is an elevational view, part in section, showing the arrangement utilized to advance the web 46 from a supply roll (not shown) to the cutting apparatus 10. Feed roller 42 is shown mounted in a position above feed roller 45. Web 46 is shown between the feed rollers 42 and 45. Drive shaft 40 furnishes rotational power to small gear 41 which meshes with gear 43. Thus, feed rollers 42 and 45 are opposite from one another in rotation. Web 46 is advanced between feed rollers 42 and 45 in a continuous manner since shaft 40 is continually rotating. To halt the flow of web 46 through feed rollers 42 and 45, a means has been provided to separate rollers 42 and 45 so that web 46 will no longer be advanced. An air cylinder 96 is mounted on frame 65. When pressure is delivered to air cylinder 96, connecting cylinder arm 97 moves upward, thus also biasing shaft bushing 98 upward. When feed rollers 42 and 45 approach each other the frictional force on the surface of web 46 will increase and web 46 will begin to move through the rollers 42 and 45. As the pressure in air cylinder 96 is relaxed, rollers 42 and 45 will move apart slightly, thus causing web 46 to stop its forward advance. Small gear 41 and the gear 43 to which it is coupled do not disengage, but continue to each rotate. The movement achieved through air cylinder 96 is not great enough to disengage the teeth of gears 41 and 43, however, the movement afforded through air cylinder 96 does stop the feeding of web 46.

Attention is once again directed to FIG. 1 and the incoming web 46 as shown at the bottom of FIG. 1. Web 46 passes through feed rollers 42 and 45 as heretofore described. The web then forms a festoon with a lower extent 48. A photoelectric sender-receiver combination 102,103 is positioned near the bottom of the festoon formed by web 46. A similar photoelectric sender-receiver combination 104,105 is positioned toward the upper extent of the festoon. The feed rollers 42 and 45 overcome the inertia of the web supply roll (not shown) and deliver web 46 at a velocity greater than the tangential velocity between the transfer wheel 25 and rotary die 28. Therefore, it is possible to create a festoon with the extra length of web 46. When the lower extent of web 46 interrupts the light beam associated with photoelectric cells 102,103, an electrical signal is delivered to a solenoid which in turn deactivates the supply of air to air cylinder 96. Rollers 42 and 45 then separate and the movement of web 46 into the festoon is stopped. When the stored web 46 in the festoon diminishes, continuity will be established within the photoelectric combination 104,105. This reestablishment of the light beam and its receptor generates an electrical signal that once again activates air cylinder 96. The flow of web 46 into the festoon is thus resumed. While the actual electrical and pneumatic coupling is not shown in detail, it is believed to be well within the capabilities of those skilled in the art to understand how the above described system operates.

Figure 7:
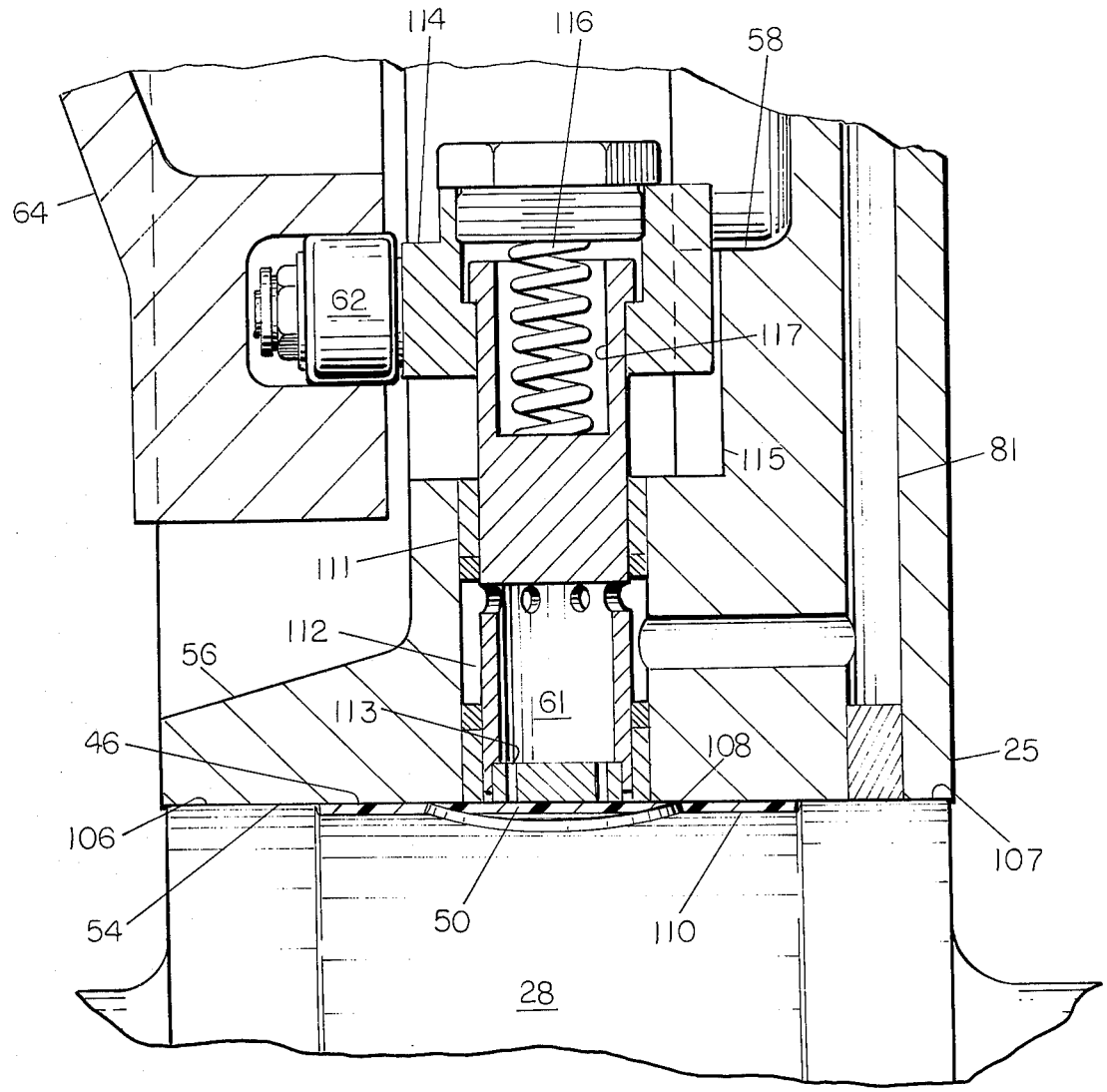
FIG. 7 is a plan view part in section taken along the lines 7—7 of FIG. 1 which shows the cutting action of the rotary die.

FIG. 7 is a part sectional view taken along lines 7—7 of FIG. 1. FIG. 7 shows the interaction between transfer wheel 25 and rotary die 28. FIG. 7 is an enlargement of the smaller view that can be seen in FIG. 2. Rotary die 28 contains two spaced apart cylindrical sections 106 and 107. Cylindrical sections 106 and 107 press against the peripheral surface 54 of transfer wheel 25. The cutting edge 108 has a radial extent complementary to the radial extent of cylinder sections 106 and 107. Cylindrical sections 106 and 107 may be brought to bear against the peripheral surface 54 in such a manner that there is no resulting flash attached to the severed disc that forms container bottom 50. The adjustment utilized to move cylindrical sections 106 and 107 against surface 54 of transfer wheel 25 is considered to be of conventional design, hence is not shown. The cutting edge 108 has a geometry that permits a circular container bottom 50 to be cut. The edges of web 46 are accommodated by an area 110 of reduced radial extent. Likewise, the central section confined by arcuate cutting edge 108 is relieved so that container bottom 50 will not be crushed by the transfer wheel 25 and rotary die 28.

FIG. 7 also shows in detail the ejector rod 61. Ejector rod 61 is slidably positioned with a bushing 111 that in turn is fitted into bore 60 of transfer wheel 25. Bushing 111 is in two cylindrical lengths with an air space 112 situated therebetween. Air space 112 is in direct communication with vacuum port 81, thus a reduced air pressure zone can be created within ejector rod 61. Additional holes 113 permit a vacuum to be applied at a plurality of locations on the surface of container bottom 50.

Ejector rod 61 moves under the influence of cam follower 62. Cam follower 62 is cantilevered from slide block 114 which is attached to ejector rod 61. Slide block 114 moves radially inward and outward along an enlarged portion 115 of bore 60. A compression spring 116 is positioned with bore 117. Spring 117 serves as a safety feature should a foreign object be encountered by ejector rod 61 when in an extended position. Thus, through the discussion supra it can be understood how transfer wheel 25 carries severed container bottoms 50 to container conveyor 200.

Figure 8:
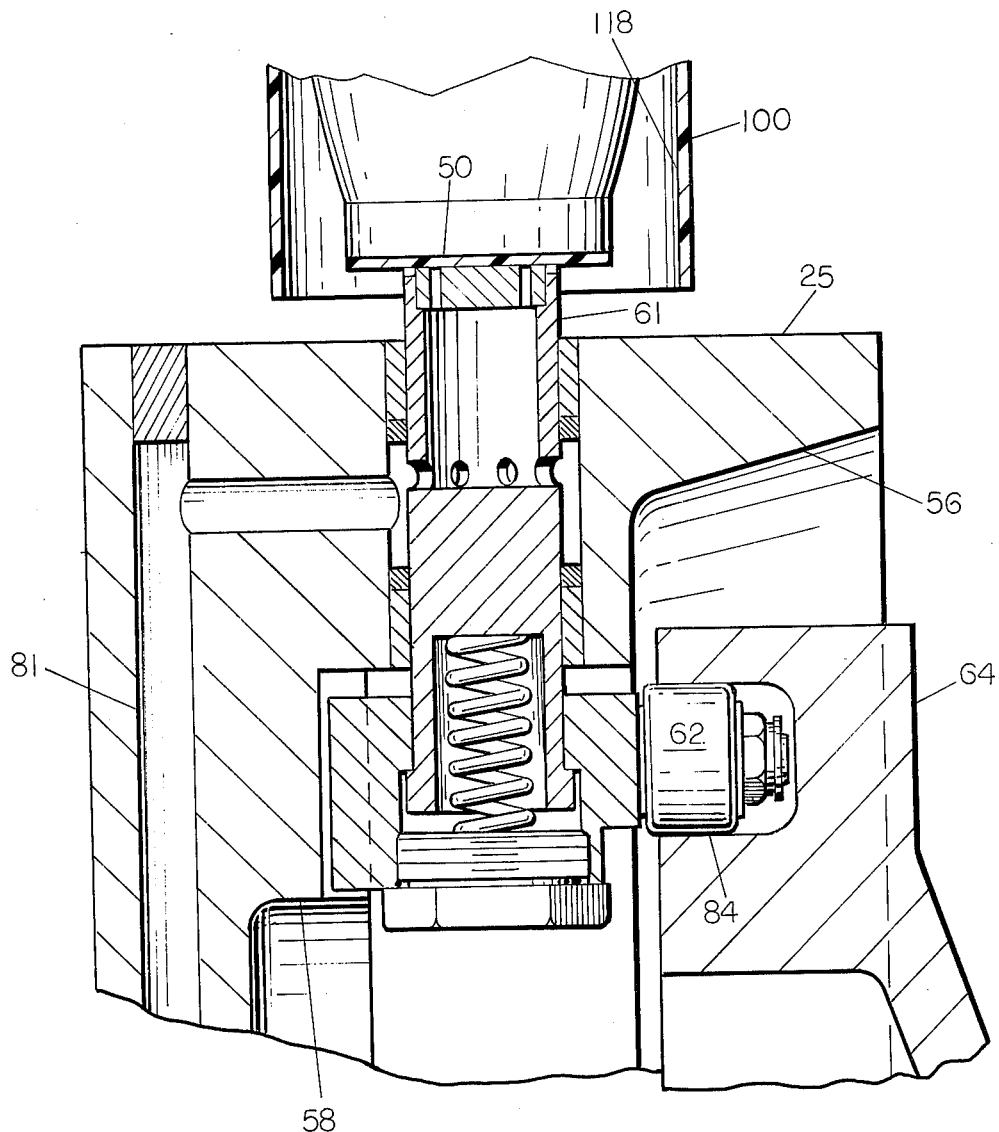
FIG. 8 is a sectioned view taken along lines 8—8 of FIG. 3 that shows a severed container bottom as positioned when delivered to the lower portion of a container sidewall shell.

FIG. 8 is a part sectional view taken along the lines 8—8 of FIG. 3. This view is quite similar to the view afforded in FIG. 7 except that the ejector rod 61 is in its fully extended position. The ejector rod 61 reaches its extended position when it arrives at the top of transfer wheel 25. Container bottom 50 is held to the end of ejector rod 61 by the vacuum supplied through holes 113. As container bottom 50 moves into final position, the vacuum supply is cut off as vacuum port 81 becomes disconnected with arcuate groove 80 in stationary vacuum manifold 66. The container bottom 50 is positioned in the proper position where it can be adhered to the bottom of container shell 118. The bottom 50 can be positioned and incorporated into a completed container in a variety of ways, some of which have been commented upon briefly, that are considered to be outside the scope of the present invention.

Reference is now made to FIGS. 1, 4 and 5 where the segmented rollers 35 and 36 are shown. FIG. 4 in particular shows web 46 as it exits the festoon arrangement previously described. Rollers 35 and 36 receive their rotational power from gears 31 and 32 as previously set forth and shown in FIG. 1. Since the power connection is not intermittent, rollers 35 and 36 rotate with a constant angular velocity. Gear 32 receives its power from gear 31, consequently, its rotation is opposite to gear 31. As segmented rollers 35 and 36 rotate, they intermittently make contact with both sides of web 46. The direction of rotation is such that web 46 is reversed in its travel toward transfer wheel 25 arrows 120 and 121, FIG. 4, depict the direction of rotation of rollers 35 and 36. When grooves 86 of rollers 35 and 36 are immediately opposed, web 46 can be advanced through rotary die 28 and transfer wheel 25. When lands 85 of rollers 35 and 36 are opposed, web 46 is reversed in direction and once again adds to the web stored in the festoon. The frictional contact produced by lands 85 contacting the surface of web 46 is great enough to overcome the force of the vacuum which has been applied to web 46 as it moves around the circumference of transfer wheel 25. Consequently, web 46 slides in a reverse direction along the surface of transfer wheel 25. Since there are two sets of lands of segmented rollers 35 and 36, there will be two occurrences each revolution of rollers 35, 36 when the direction of web 46 is actually reversed.

Referring specifically to FIG. 1, it can be observed that container bottoms 50 are arcuately spaced at a distance equal to the linear spacing of the container shells arrayed on container conveyor 200. If web 46 was fed directly through rotary die 28 with no retardation or reverse flow or web 46, the rotary die would cut a container bottom out of web 46 with a spacing equal to the spacing of the containers on conveyor 200. This procedure would create widely spaced apart holes in web 46, thus causing a less than optimum utilization of the material contained in web 46. Segmented rollers 35 and 36 are so synchronized with the rotary die 28 to cause a reverse flow of web 46 just after a blanking operation has been performed. Web 46 is repositioned with respect to the cutting edge 108 of rotary die 28 so that the next container bottom 50 is removed from web 46 quite close to the previously removed container bottom 50. Through the reversing of web 46 it is possible to utilize all of web 46 and blank out container bottoms with a minimum of leftover material. FIG. 1 shows web 46 as it exits from between transfer wheel 25 and rotary die 28; note the closely spaced blanks 122. In contrast, container bottoms 50 are spaced quite some distance from one another as they progress around the arcuate path of transfer wheel 25.

Attention is once again directed to FIG. 5 and the clamp bar arrangement briefly commented upon before. From time to time it is desirable to stop the delivery of container bottoms 50 to conveyor line 200 without actually stopping the entire apparatus 10. Consequently, it is possible to stop the movement of web 46 to rotary die 28. The movement of web 46 is stopped by causing actuator 128 (FIG. 4) to contract arm 130. Arm 130 is connected to the support of segmented roller 36 and can cause it to move slightly away from adjacent coacting segmented roller 35. When segmented roller 36 has moved away from roller 35, the web 46 is no longer affected by the rollers. The clamping action afforded by clamp bar 91 immobilizes web 46 against stationary guide 87. The clamping action of clamp bar 91 is great enough to overcome the vacuum caused force applied to web 46 by transfer wheel 25, consequently, web 46 slides with respect to transfer wheel 25 which continues to rotate.

FIG. 1 also shows an alignment device 123 in the upper right-hand part of the drawing. The alignment device moves in oscillatory fashion under the influence of rod 124 and crank 125. Crank 125 is attached to drive shaft 126 and shaft 26 is fixed to gear 127. Gear 127 is driven by main drive gear 23 as shown in the drawing. Alignment device 123 can perform functions such as centering containers on conveyor 200 and the device can also assure that container bottom is securely affixed to the container shell.

The present invention does provide a method of feeding a web of material to a cutting device so that a maximum number of cut articles can be removed from the web. In the ordinary web feed device, the web is continually advanced so that each cut will be quite close to the previously made cut. The advancing direction of the web may be of intermittent nature, however, it does not reverse itself. The web feed mechanism of the present invention causes the web to advance, a cut is made, then the web is reversed in direction so that the next cut occurs adjacent the previous cut with a minimum of material existing between cuts.

As has been set forth in conjunction with the description of the apparatus of the present invention, a festoon arrangement is provided for storing web material just prior to articles being cut therefrom. The festoon arrangement permits the web to be fed without incurring the large and variable inertia load caused by the mass of the feed roll itself. The festoon size since web material is always being fed into it from the feed roll side and material is intermittently fed into the festoon from the side adjacent the cutting die. Thus, at certain times the festoon is increasing in size because material is being fed into it from both sides.

With the preceding detailed description and discussion of the invention, it can be readily ascertained just how the rotary concept of the invention can be used to attain greater production speeds on a container manufacturing line.

What is claimed is:

1. An apparatus for severing and transferring a container bottom comprising motor means coupled to a gear train, a transfer wheel coupled to said gear train, rotary die means positioned tangentially adjacent to said transfer wheel, means for feeding a web of material between said transfer wheel and said rotary die means, web feed means driven by said gear train and means coupled to said gear train for reversing the direction of movement of said web with respect to said transfer wheel.

2. An apparatus for severing a container bottom from a continuous web of material and transferring said bottom to a mandrel comprising motor means attached to a gear train, a transfer wheel powered by said gear train, rotary die means positioned in contact with said transfer wheel and powered by said gear train, means coupled to said transfer wheel for advancing a web of material along the periphery of said wheel, means positioned adjacent to said transfer wheel for periodically reversing the direction of movement of said web with respect to the direction of movement of the peripheral surface of said transfer wheel.

3. An apparatus for severing a container bottom from a moving web of material comprising motor means coupled to a gear train with gear reduction means interdisposed therebetween, a transfer wheel powered by one of the gears in said gear train, rotary die means positioned adjacent to and coacting with said transfer means for feeding a web of material between said rotary die means and said transfer wheel, means coupled to said transfer wheel for advancing said web of material past said rotary die means and means driven in synchronism with said transfer wheel for periodically reversing the direction of movement of said web with respect to the direction of movement of said transfer wheel.

4. A container bottom transfer apparatus comprising a transfer wheel positioned with its rotational axis in horizontal alignment, a rotary die with cutting means thereon positioned adjacent to and contacting said transfer wheel, means coupled with said transfer wheel to retain a web of material against the peripheral surface of said wheel, means for retaining individual container bottoms against the peripheral surface of said wheel after they have been severed from said web, means for moving the severed container bottoms in a radial direction from the peripheral surface of said transfer wheel to the bottom of a nearby container mandrel.

5. A container bottom transfer apparatus comprising a transfer wheel positioned with its rotational axis in horizontal alignment, a rotary die with a plurality of arcuately disposed cutting surfaces thereon, said cutting surfaces coacting with the periphery of said transfer wheel, means for adhering a web of material to the peripheral surface of said transfer wheel so that said web is immobilized with respect to said surface yet moves in an arcuate path along with said surface, means for retaining individual container bottoms in spaced relationship one with another as they are translated by said transfer wheel, means for moving said container bottom in a radial direction away from said transfer wheel rotational axis and toward the bottom of a nearby container mandrel.

6. A container bottom transfer and severing apparatus including a transfer wheel with its rotational axis horizontally aligned, drive means coupled to said transfer wheel to provide rotation, a rotary die with a plurality of arcuately disposed circumferentially spaced cutting surfaces thereon, said cutting surfaces coacting with the cylindrical periphery of said transfer wheel, said rotary die powered by drive means common to said transfer wheel, web advancing means positioned adjacent said transfer wheel for moving a web of material toward said wheel and web reversing means interdisposed between said web advancing means and said wheel for intermittently reversing the direction of movement of said web.

7. A container bottom transfer and severing apparatus as claimed in claim 6 wherein the web reversing means comprises a pair of coating rollers, each roller having at least one peripheral surface area of greater radial extent than the peripherally adjacent areas.

8. A container bottom transfer and severing apparatus as claimed in claim 7 wherein each of said rollers has a plurality of cylindrically shaped circumferentially extending lands of greater radial extent than the grooves positioned between said lands, the rollers being so oriented that the lands of each respective roller coincide with one another to grasp said web and reverse its direction of movement.

9. A container bottom transfer and severing apparatus comprising a drive motor coupled to a gear train having a main drive gear and a plurality of secondary drive gears, a transfer wheel attached to said main drive gear by an elongate shaft, said shaft disposed in a horizontal attitude, a rotary cutting die driven by one of said secondary gears, said die mounted for rotation on a shaft paralleling the shaft supporting said transfer wheel, some of the peripheral surfaces of said die continually contacting a portion of the periphery of said transfer wheel, web and container bottom holding means positioned around the periphery of said transfer wheel, a plurality of radially aligned circumferentially spaced container bottom ejector rods slidably positioned within said transfer wheel, a plurality of web feed rollers deriving rotational power from said main drive gear, the axis of at least one of said web feed rollers being translatable to move the arcuately rotating surfaces of said web feed rollers toward and away from one another so that a web of material can be moved toward said transfer wheel, a pair of web reversing rollers positioned between said web feed rollers and said transfer wheel, said web reversing rollers each powered by shaft and gear means coupled with said main drive gear, said web reversing rollers each having diametrically opposed circumferentially extending lands of a greater radial extent than the grooves positioned between said lands, the rollers being so oriented that the lands of each respective roller coincide with one another to grasp said web and reverse its direction of movement, said web reversing rollers being driven in synchronism from power derived from said main drive gear.

10. A container bottom transfer and severing apparatus comprising a drive motor coupled to a gear train with a gear reduction box interpositioned therebetween, said gear having a main gear train and a plurality of secondary drive gears coupled therewith, said main gear coupled to a transfer wheel and one of said secondary gears coupled to a rotary die, said gears being connected to said transfer wheel and rotary die by means of horizontally aligned shafts such that the rotation of the transfer wheel is counter the rotation the rotary die, some of the peripheral surfaces of said die continually contacting a portion of the periphery of said transfer wheel, apertures placed at a plurality of locations in the periphery of the transfer wheel so that a vacuum can be maintained against a web of material positioned on said wheel, a plurality of radially aligned circumferentially spaced container bottom ejector rods slidably positioned within said wheel, said ejector rods activated by stationary cam means so that container bottoms can be selectively moved in a radial direction by the ejector rod to a position adjacent a container mandrel, a plurality of web feed rollers coupled by a drive shaft to one of said secondary drive gears, said web feed rollers operable in an intermittent manner to pull web material from a web supply roll and deposit said web in a festoon, means to control the amount of web material in said festoon, a pair of web reversing rollers positioned at the exiting end of said festoon and adjacent to said transfer wheel, said web reversing rollers powered by counter-rotating drive shafts coupled to one of said secondary drive gears, said web reversing rollers each having two diametrically opposed circumferentially extending lands cylindrical in configuration and of greater radial extent than the adjacently positioned cylindrically shaped grooves, the rollers being so oriented that the lands of each respective roller coincide with one another to grasp said web, overcome the force of the vacuum afforded by the transfer wheel, and reverse the web direction so that the web slides along the surface of the transfer wheel and joins the web stored in said festoon.

11. A container bottom transfer and severing apparatus as claimed in claim 10 including a reciprocating container bottom press for contacting the container bottoms subsequent to discharge from said delivery wheel, said press deriving power from said main gear.

12. A container bottom transfer and severing apparatus as claimed in claim 10 including a guide and movable bar for stopping the flow of said web without stopping the rotation of said transfer wheel.

13. A container bottom transfer and severing apparatus as claimed in claim 10 including manifold means for adjusting the time a vacuum is applied to said transfer wheel.

14. The method of cutting and translating container bottoms including the steps of;
   (a) feeding a continuous web of container bottom material to a transfer wheel,
   (b) advancing said web along with said wheel as it rotates,
   (c) subjecting said web to the action of a rotary die that coacts with said transfer wheel,
   (d) severing container bottoms from said web by means of a cutting edge positioned on said die,
   (e) translating said container bottoms in spaced apart array along the peripheral surface of said transfer wheel,
   (f) moving the container bottoms in a radial direction away from the surface of said wheel while said container bottoms are being rotated with said wheel,
   (g) depositing each of said container bottoms against a mandrel bottom so that the container bottom can be incorporated into a finished article.

15. The method of cutting and translating container bottoms including the steps of;
   (a) removing a web of material from a material source roll,
   (b) feeding a continuous web of container bottom material to a transfer wheel,
   (c) immobilizing said web against the peripheral surface of said wheel,
   (d) advancing the web along with said wheel as it rotates with constant angular velocity,
   (e) subjecting said web to the action of a rotary die that coacts with said wheel,
   (f) severing container bottoms from said web by means of cutting edges positioned on said die,
   (g) translating said container bottoms in from a lower elevation to a higher elevation while being spaced apart along the peripheral surface of said transfer wheel,
   (h) moving each the container bottoms in a radial direction away from the surface of said wheel while said container bottoms are being rotated with said wheel,
   (i) depositing each of said container bottoms against a mandrel so that each of the container bottoms can be incorporated into a finished article.

16. The method of cutting and translating a container bottom including the steps of;
   (a) feeding a web of material to the combination of a rotary die and a coacting transfer wheel,
   (b) cutting a first container bottom from the web of material and permitting the container bottom to remain in contact with the transfer wheel,
   (c) reversing the direction of movement of the web by sliding it along the periphery of the transfer wheel,
   (d) cutting a second container bottom from said web after it has been reversed in direction so that said second bottom is cut from a portion of the web closely adjacent to that area of the web from which said first bottom was removed whereby the spacing of the cut bottoms along the periphery of the transfer wheel is greater than the spacing of the holes in the web from which the container bottoms were severed.

17. The method of cutting and translating a container bottom including the steps of;
   (a) removing a web of container bottom material from a source roll by pulling it therefrom with power driven feed rollers,
   (b) storing a loop of container bottom web feed material in a festoon of varying arcuate extent,
   (c) feeding said web to the lower extent of a transfer wheel,
   (d) immobilizing said web against the peripheral surface of said transfer wheel by vacuum means,
   (e) advancing said web along with said wheel as it rotates with constant angular velocity.
   (f) subjecting said web to the action of a rotary die that coacts with said wheel,
   (g) severing a first container bottom from said web by means of cutting edges positioned on the peripheral surface of said die and securing the container bottom to the outside surface of the transfer wheel by vacuum means, (h) reversing the direction of movement of said web by sliding it along the surface of the transfer wheel, (i) severing a second container bottom from said web after the reversing of the web direction has stopped, (j) positioning the second container bottom on the periphery of the transfer wheel so that center to center spacing of said first and second container bottoms greatly exceeds the center to center spacing of the holes in the web from which the container bottoms were severed, (k) storing a plurality of cut container bottoms along the periphery of the transfer wheel, (l) translating said container bottoms in curvilinear fashion from a lower elevation to a higher elevation, (m) simultaneously moving each container bottom in a circular and radial extent, (n) depositing each container bottom against a mandrel as the mandrels are carried at a uniform velocity and in spaced apart array tangentially past said transfer wheel whereby the container bottoms can be incorporated into a completed container.

* * * * *

UNITED STATES PATENT AND TRADEMARK OFFICE
CERTIFICATE OF CORRECTION

PATENT NO. : 4,084,490
DATED : April 18, 1978
INVENTOR(S) : Thomas E. Doherty

It is certified that error appears in the above-identified patent and that said Letters Patent are hereby corrected as shown below:

Col. 11, line 38 (Claim 3), after transfer insert --wheel,--

Col. 13, line 5 (Claim 10), after rotation insert --of--

Signed and Sealed this

Nineteenth Day of September 1978

[SEAL]

Attest:

RUTH C. MASON
*Attesting Officer*

DONALD W. BANNER
*Commissioner of Patents and Trademarks*